(12) United States Patent
Matsui et al.

(10) Patent No.: US 6,599,019 B2
(45) Date of Patent: Jul. 29, 2003

(54) RETAINER FOR ROLLER BEARING

(75) Inventors: Masahito Matsui, Kanagawa (JP); Takashi Murai, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/075,604

(22) Filed: Feb. 15, 2002

(65) Prior Publication Data
US 2003/0068110 A1 Apr. 10, 2003

(30) Foreign Application Priority Data
Feb. 16, 2001 (JP) ........................... 2001-040406

(51) Int. Cl.[7] .................................. F16C 33/46
(52) U.S. Cl. ........................... 384/450; 384/572
(58) Field of Search ........................ 384/450, 572, 384/575, 576, 580

(56) References Cited
U.S. PATENT DOCUMENTS
6,132,102 A * 10/2000 Bessone et al. ............ 384/576

FOREIGN PATENT DOCUMENTS
| JP | 10253747 | * 9/1998 |
| JP | 10267038 | * 10/1998 |
| JP | 2001-12477 | 1/2001 |

* cited by examiner

*Primary Examiner*—Lenard A Footland
(74) *Attorney, Agent, or Firm*—Sughrue Mion, PLLC

(57) ABSTRACT

A retainer for a roller bearing includes a pair of annular portions and a plurality of columns 23 provided between the annular portions. A plurality of pockets are defined by the annular portion and the column each for receiving a roller. An indented relief is provided on the corners of the plurality of pockets and the circumferential average width d (mm) of the column at the area where the indented relief is provided, the axial thickness t (mm) of the annular portion at the area where the indented relief is provided, the radius r (mm) of curvature of the indented relief, the average diameter Da (mm) of the roller and the pitch circle diameter dm (mm) of the bearing satisfy a relationship:

$$0.07 \times dm + 20 \leq (2/d + 4/t + 1/r) \times Da \leq 0.07 \times dm + 50.$$

10 Claims, 15 Drawing Sheets

RETAINER FOR ROLLER BEARING

BACKGROUND OF THE INVENTION

1. Field of the Invention

The present invention relates to a retainer for use in a roller bearing.

2. Description of the Related Art

As shown in FIG. 16A, a retainer 90 includes a comb-like annular body 95, a ring-like cover 94, and a rivet 96 connecting the comb-like annular body 95 to the ring-like cover 94. The retainer 90 is an annular body having a pair of annular portions 92, 94 provided on the axial sides of a pocket 91 and a plurality of columns 93 connecting the pair of annular portions 92, 94 provided on the circumferential sides of the pocket 91. In other words, the rectangular pocket 91 is defined by the annular portions 92 and 94 and the column 93.

The pocket 91 of the retainer 90 has four corners. The comb-like annular body 95 has corners formed in an arc having a radius Rc of curvature. The radius Rc of curvature is predetermined to be smaller than the length of the chamfer of the end of a roller (not shown) to avoid an interference with the roller received in the pocket 91.

FIG. 16B is a sectional view taken on the line B-B of FIG. 16A illustrating a section of the column 93.

An important problem for the enhancement of the strength of the retainer 90 is how the strength of the corners of the pocket 91 onto which stress is concentrated is enhanced.

In order to relax the concentration of stress onto the corners of the pocket 91, it is proposed that the radius Rc of curvature of the corners of the pocket 91 be raised. However, this causes interference of the corners with the chamfer of the end of the roller, Thus, the radius Rc of curvature cannot be raised too much, occasionally making the relaxation effect insufficient.

SUMMARY OF THE INVENTION

The invention has been worked out under these circumstances. An aim of the invention is to provide a retainer for roller bearing having a drastically enhancement of the strength of the corners of the pocket and hence the retainer can be attained by a simple structure.

The foregoing aim of the invention is accomplished by the following constitution of retainer.

A retainer for roller bearing comprising a pair of annular portions, a plurality of columns provided between the annular portions and a plurality of pockets defined by the annular portion and the column each for receiving a roller, wherein an indented relief is provided on the corners of the plurality of pockets and the circumferential average width d (mm) of the column at the area where the indented relief is provided, the axial thickness t (mm) of the annular portion at the area where the indented relief is provided, the radius r (mm) of curvature of the indented relief, the average diameter Da (mm) of the roller and the pitch circle diameter dm (mm) of the roller bearing satisfy the following relationship [1]:

$$0.07 \times dm + 20 \leq (2/d + 4/t + 1/r) \times Da \leq 0.07 \times dm + 50 \quad [1]$$

In accordance with the foregoing retainer for roller bearing, the indented relief 15 having a predetermined size provided on the corners of the pocket 11 make it possible to remarkably relax the concentration of stress onto the corners of the pocket of the retainer (e.g., retainer for cylindrical roller bearing) 10 as shown in FIG. 1. Thus, the strength of the retainer 10 can be drastically enhanced.

Further, as shown in FIG. 2, the indented relief 15 provided on the corners of the pocket 11 form a passage communicating the space on the outer ring side (space between the retainer 10 and the outer ring (not shown)) to the space on the inner ring side (space between the retainer 10 and the inner ring 18). The lubricant attached to the surface of the rollers 19 is partly scratched off by the column 13 of the retainer 10 but is not scratched off the column 13 at the indented relieves 15 so that it moves, e.g., from the space on the outer ring side to the space on the inner ring side. Since the indented relief 15 is disposed very close to the position at which the rib 18a provided on the inner ring 18 or the like and the end face of the roller 19 come in contact with each other, the lubricant is sufficiently supplied into the contact position 18b. In this arrangement, troubles such as seizing and abrasion on the contact position 18b can be prevented, making it possible to improve the bearing performance.

DETAILED DESCRIPTION OF THE PREFERRED EMBODIMENTS

Embodiments of implication of the invention will be further described hereinafter.

Figure 3:
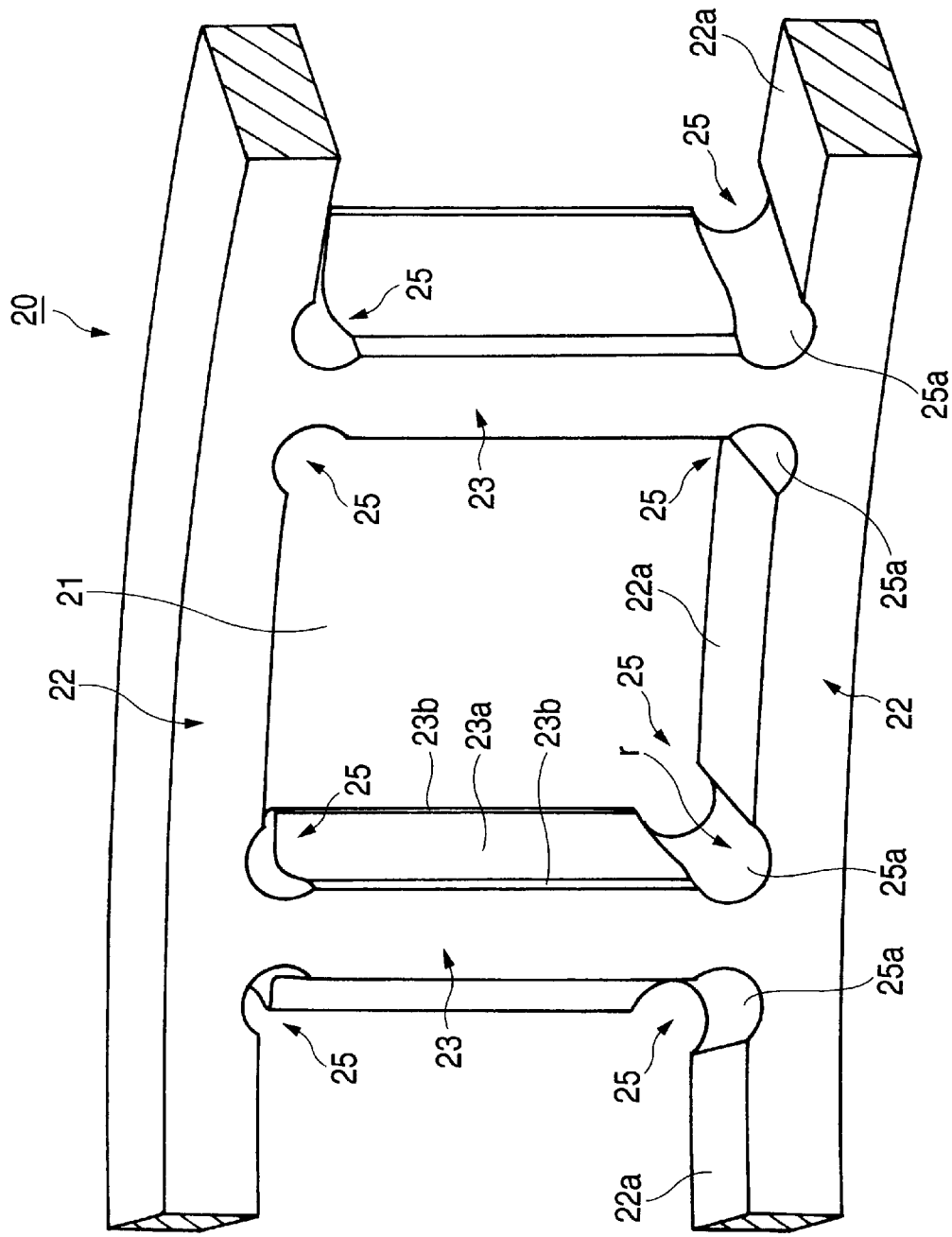
FIG. 3 is a diagram illustrating an embodiment of implication of the invention.

Firstly, the invention will be further described with reference to a machined retainer (a pocket 21 is machined for finishing through such as milling) for cylindrical roller bearing by way of example. As shown in FIG. 3, the retainer 20 is an annular body having a pair of annular portions 22, 22 provided on the axial sides of a pocket 21 and a plurality of columns 23 formed integrally to the pair of annular portions 22, 22 on the circumferential sides of the pocket 21. A cylindrical roller (not shown) is received in each of the rectangular pockets 21 divided by the annular portions 22 and the columns 23 and disposed circumferentially apart from each other.

The side faces 23a of the columns 23 are each formed in the form of part of a cylinder having a slightly greater diameter than the outer diameter of the cylindrical roller (not shown) disposed opposed thereto. Provided radially inside (front side as viewed on the drawing) and radially outside (back side as viewed on the drawing) the side face 23a are run-out preventing portions (engagement portions) 23b, 23b for control guiding the roller to prevent the run-out of roller.

Provided on the four corners of each of the pockets 21, i.e., in the vicinity of the crossing of the inner surface 22a of the annular portion 22 with the side face 23a of the column 23 are indented relieves 25 extending in a radial direction of the retainer.

In the embodiment shown in FIG. 3, the indented relieves 25 are each formed extending over both the side face 23a of the column and the inner surface 22a of the annular portion. A step portion is formed between the indented relief 25 and the side face 23a of the column and between the indented relief 25 and the inner surface 22a of the annular portion. In this embodiment, the indented relief 25 is formed uniformly in the radial direction to keep a processing cost down. The radius r of curvature of the circumference 25a of the indented relief 25 is constant over the entire radial range.

In order to raise the strength of the column 23 at the area where the indented relief 25 is provided, the shape of the indented relief 25 can be predetermined such that the second moment of area of the column 23 at this area is raised.

It was also proved even if the second moment of area is not determined that the greater the sectional area of the column 23 at the area where the indented relief 25 is provided, the smaller can be the stress concentration caused at this area.

The provision of such an indented relief 25 makes it possible to relax the concentration of stress on the four corners of the pocket 21 and hence enhance the strength of the retainer 20. In this arrangement, the fatigue failure of the retainer 20 or the like can be inhibited. The indented relief 25 makes it possible to accelerate the flow of the lubricant.

Accordingly, the prolongation of the life of the retainer 20 can be attained by a simple structure.

In order to relax the concentration of stress, the radius r of curvature of the indented relief 25 may be as great as possible. However, when the radius r of curvature of the indented relief 25 is too great, the thickness of the column 23 and the annular portion 22 is too small, deteriorating the strength of the column 23. Accordingly, the radius r of curvature of the indented relief 25 must be properly predetermined taking into account the balance.

Using a finite element method (FEM), the shape of the retainer which is considered to have the highest strength was studied with the value of dimension of column 23 and annular portion 22 and radius r of curvature as parameters. Calculation was made on a retainer for a bearing having a bore diameter of 25 mm (first type) and a retainer for a bearing having a bore diameter of 90 mm (second type).

Figure 4:
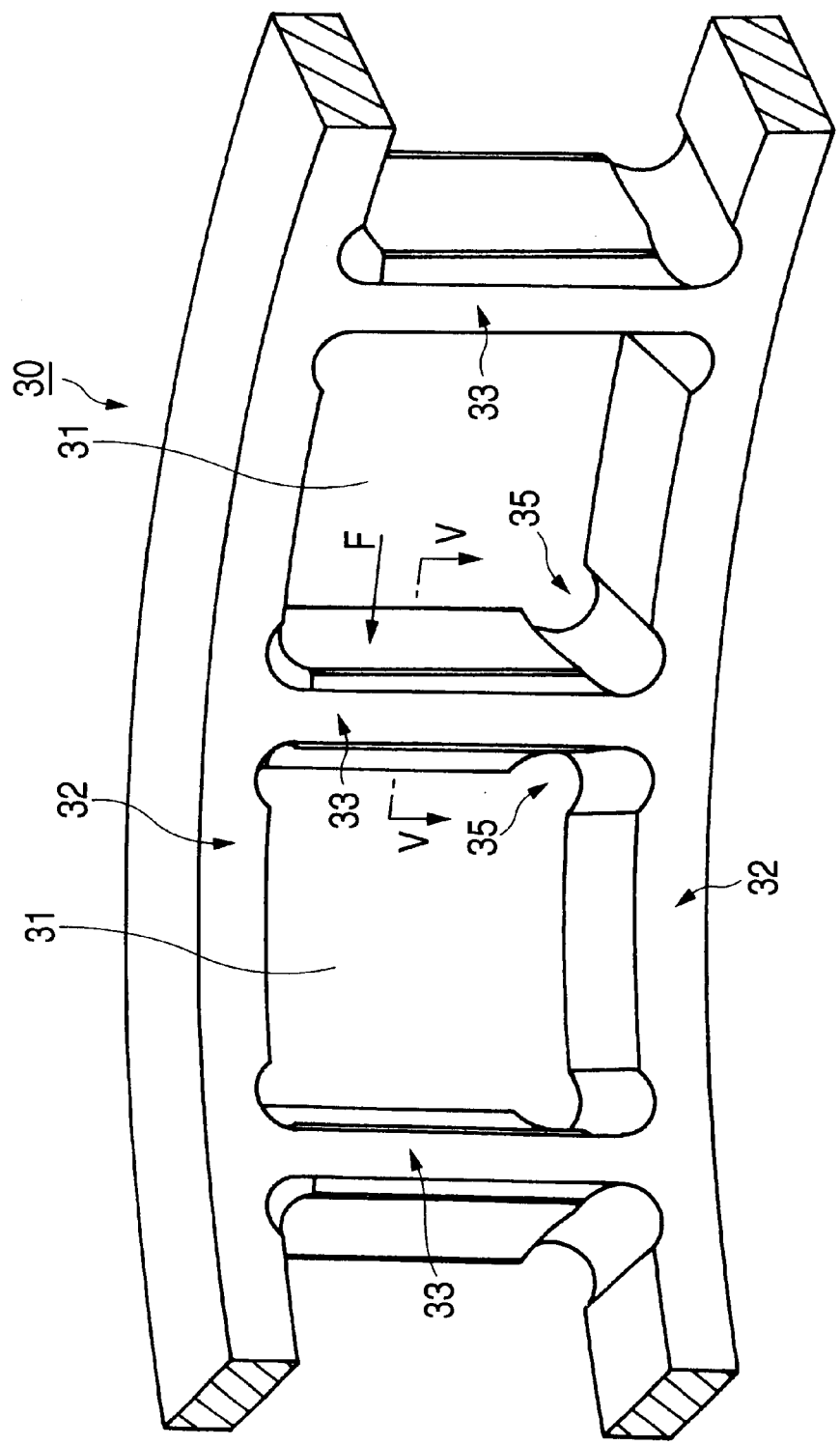
FIG. 4 is a diagram illustrating a model for FEM analysis.

FIG. 4 illustrates a model of a retainer used in FEM analysis.

As the foregoing first type of retainer there was prepared a model comprising a column 33 having an average circumferential width of 3 mm and a radial width of 4 mm and an annular portion 32 having an axial thickness of 3 mm with the size (diameter Da of a roller, length L of a roller) and number of rollers kept constant. The size and shape of the indented relief 35 were varied.

As the foregoing second type of retainer there was prepared a model comprising a column 33 having an average circumferential width of 5 mm and a radial width of 9 mm and an annular portion 32 having an axial thickness of 4 mm with the size (diameter Da of a roller, length L of a roller) and number of rollers kept constant. The size and shape of the indented relief 35 were varied.

Figure 1:
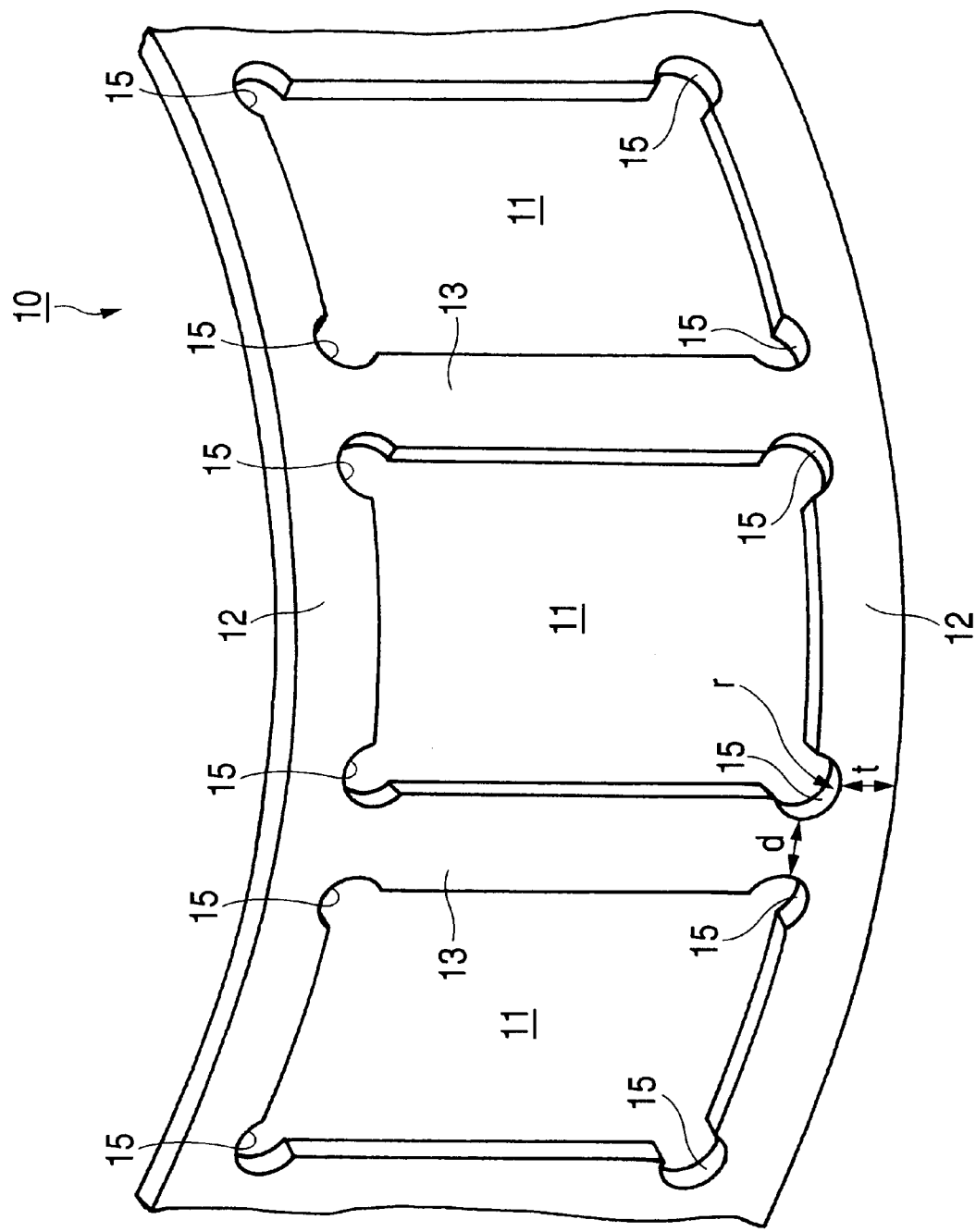
FIG. 1 is a partial perspective view illustrating an embodiment of implication of the invention.
Figure 2:
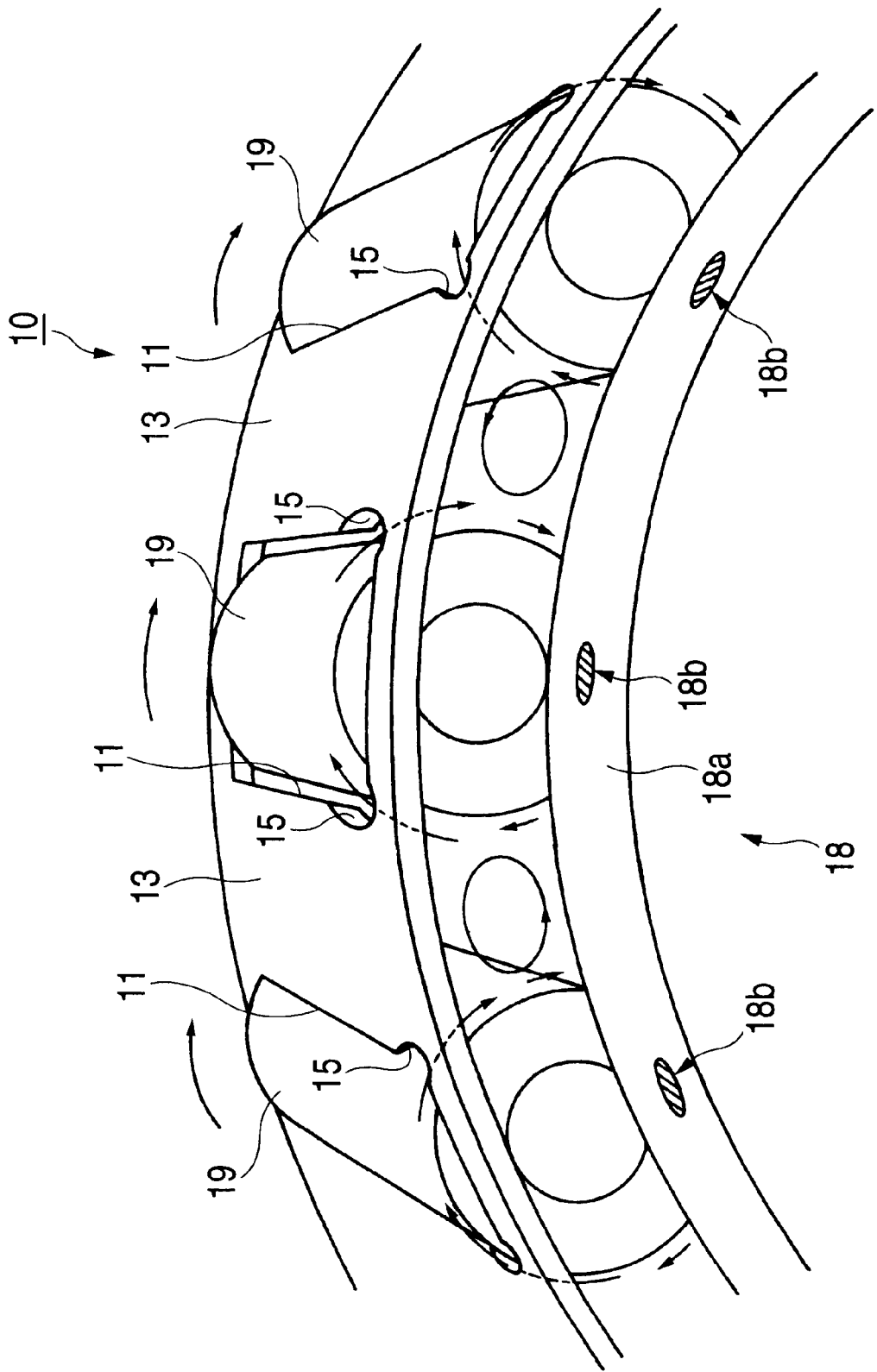
FIG. 2 is a perspective view illustrating the action of an embodiment of implication of the invention.

During the operation of a bearing having a retainer mounted therein, the rollers each revolve while rolling as shown in FIG. 2. The retainer rotates at the same speed as the rollers revolve, presumably causing the rollers to press against the column of the retainer. It is thus thought that a high stress occurs on the corners of the pockets of the retainer, causing the fatigue failure of the retainer beginning with the corners.

Accordingly, the FEM analysis was conducted as follows.
(i) A load F corresponding to the force by which the roller is pressed against the column is applied to the central column of the three columns 33 shown in FIG. 4.
(ii) As the size and shape of the indented relief 35 are varied, the maximum of the maximum principal stress occurring on the four corners of the pocket 31 is determined.
(iii) The results of calculation are compared to study the size and shape of the intended relief 35 allowing the reduction of stress occurring on the corners. Incidentally, there is a relationship between the occurred stress and the life of the retainer.

Figure 5:
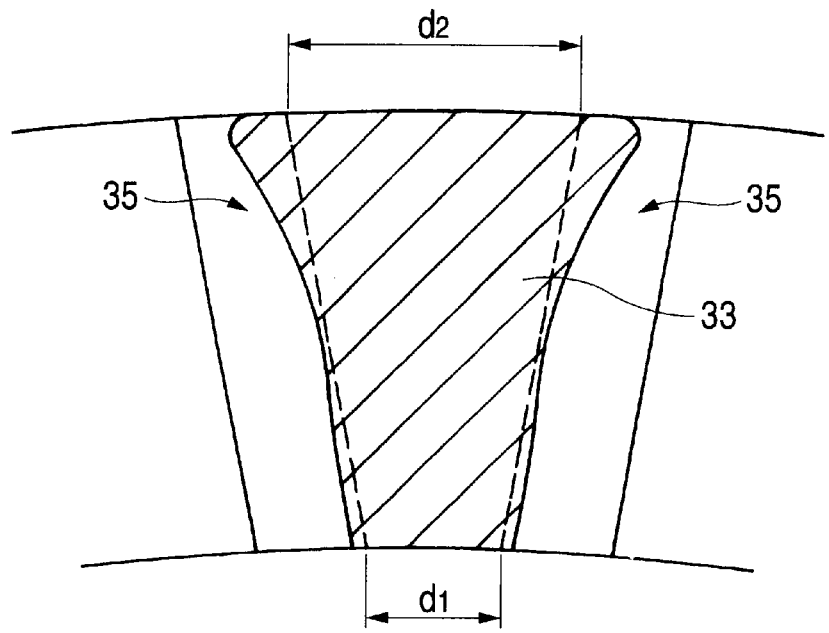
FIG. 5 is a sectional view taken on the line V—V of FIG. 4.

FIG. 5 is a sectional view taken on the line V—V of FIG. 4. In this model, the intended relief 35 extends uniformly over the radial direction. The radius of curvature of the circumference of the indented relief 35 is constant over the total radial range.

The column 33 has a circumferential width of d1 on the inner side thereof (bore diameter side of roller bearing) and a circumferential width of d2 on the outer side there of (outside diameter side of roller bearing) at the area where the indented relief 35 is provided.

The size and shape of the indented relief will be further described hereinafter.

Figure 6A:
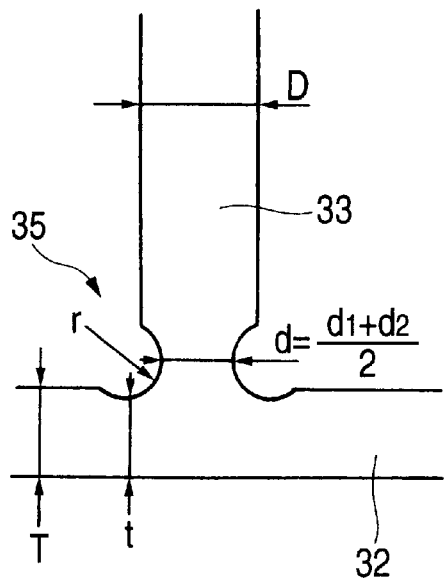
FIGS. 6A and 6B are diagrams illustrating examples of the shape of the corners of the pocket.

FIG. 6A illustrates an embodiment of the indented relief 35 formed by an arc surface having a single radius r of curvature extending over both the side face of the column 33 and the inner surface of the annular portion 32.

In this embodiment, the circumferential average width d of the column 33 at which the intended relief 35 is provided was predetermined to be minimum of the value obtained by dividing the sum of d1 and d2 by 2 ((d1+d2)/2) shown in FIG. 5. In other words, the circumferential average width of the thinnest portion of the column 33 at which the intended relief 35 is provided is defined to be d. In FIG. 6A, D indicates the circumferential average width of the column 33 at the area other than the indented relief 35. In this model, D is predetermined to be 3 mm (first type) or 5 mm (second type).

The axial thickness t of the annular portion 32 at the area where the indented relief 35 is provided was predetermined to be the value measured at the thinnest portion of the annular portion 32. In FIG. 6A, T indicates the axial thickness of the annular portion 32 at the area other than the indented relief 35. In this model, T is predetermined to be 3 mm (first type) or 4 mm (second type).

Figure 6B:
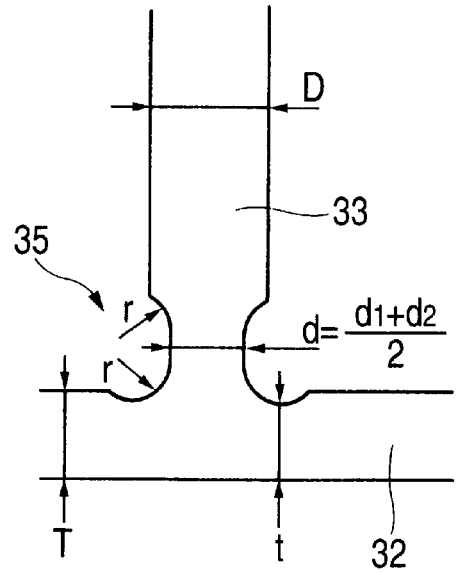

FIG. 6B illustrates an embodiment of the indented relief 35 formed by an ellipsoidal arc surface having arcs with the same radius r of curvature connected to each other, In this embodiment, too, the circumferential average width d of the column 33 at which the intended relief 35 is provided was predetermined to be the value measured at the thinnest portion of the column 33. The axial thickness t of the annular portion 32 at the area where the indented relief 35 is provided was predetermined to be the value measured at the thinnest portion of the annular portion 32.

When two or more arc surfaces have different radii of curvature, the minimum of these radii of curvature may be defined to be r.

Figure 7:
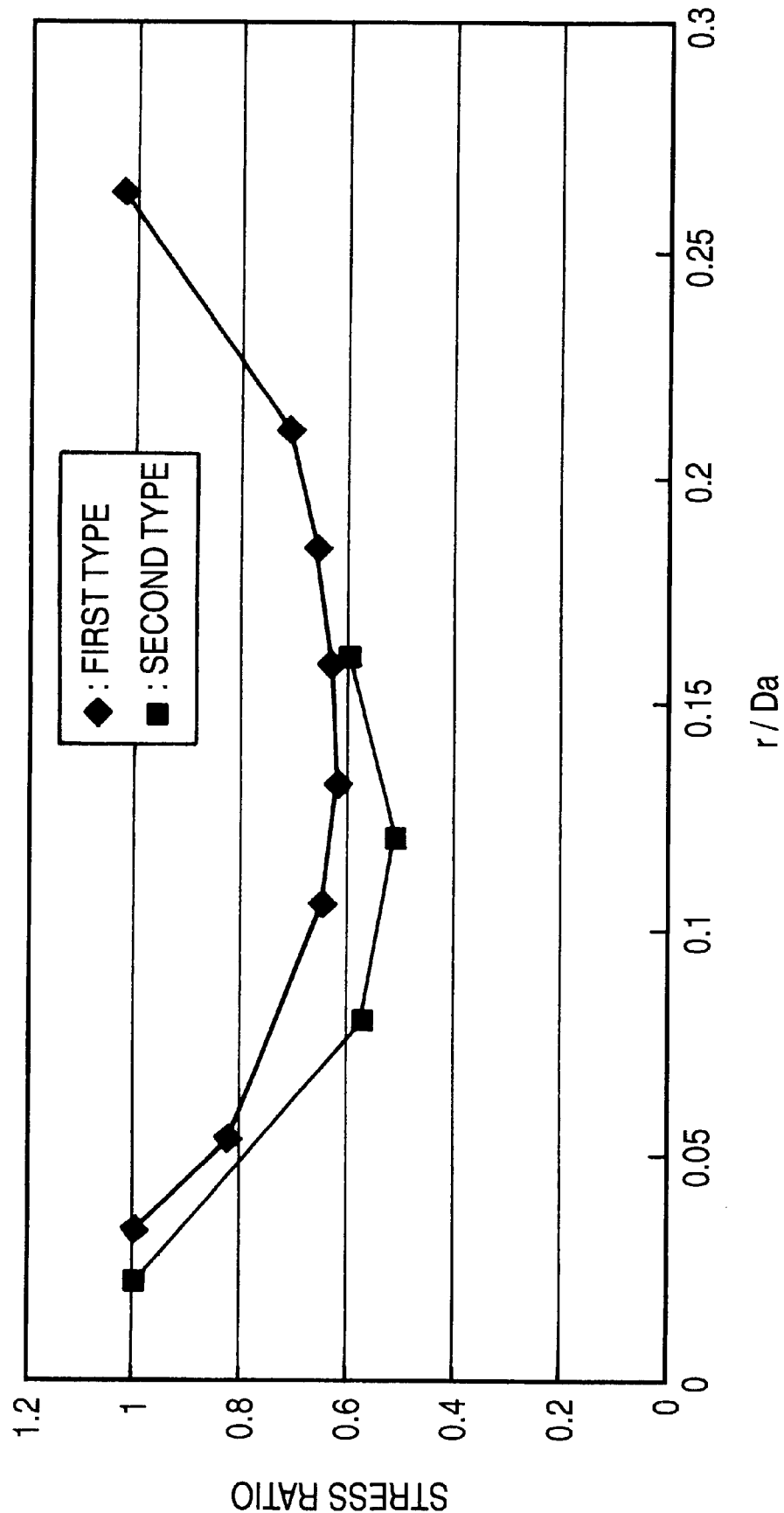
FIG. 7 is a graph based on FEM analysis.
Figure 15A:
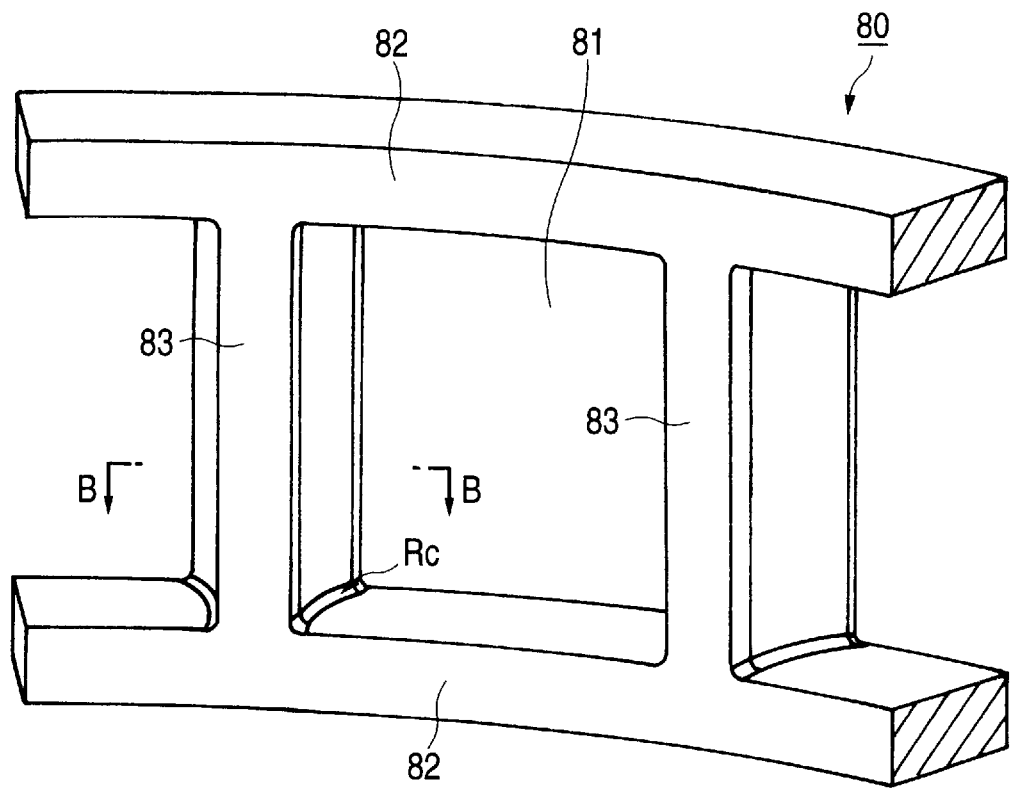
FIGS. 15A and 15B are diagrams illustrating a retainer for comparison example.
Figure 15B:
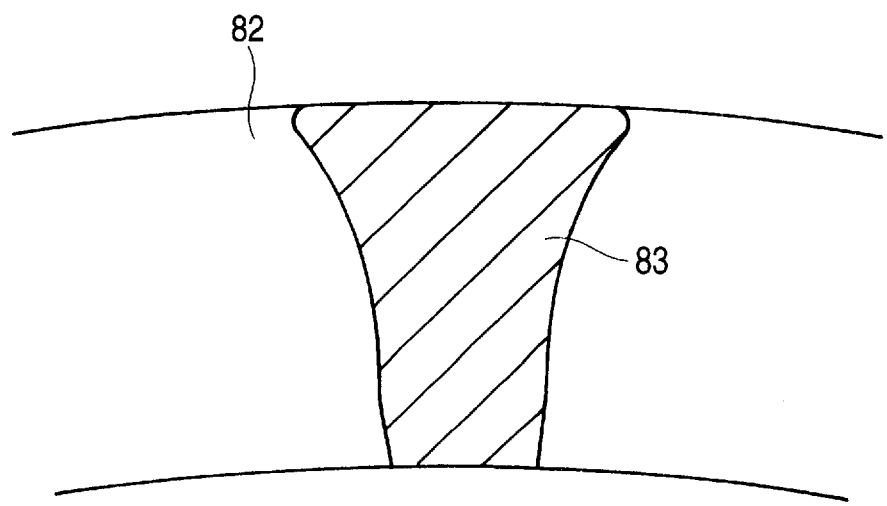
Figure 16A:
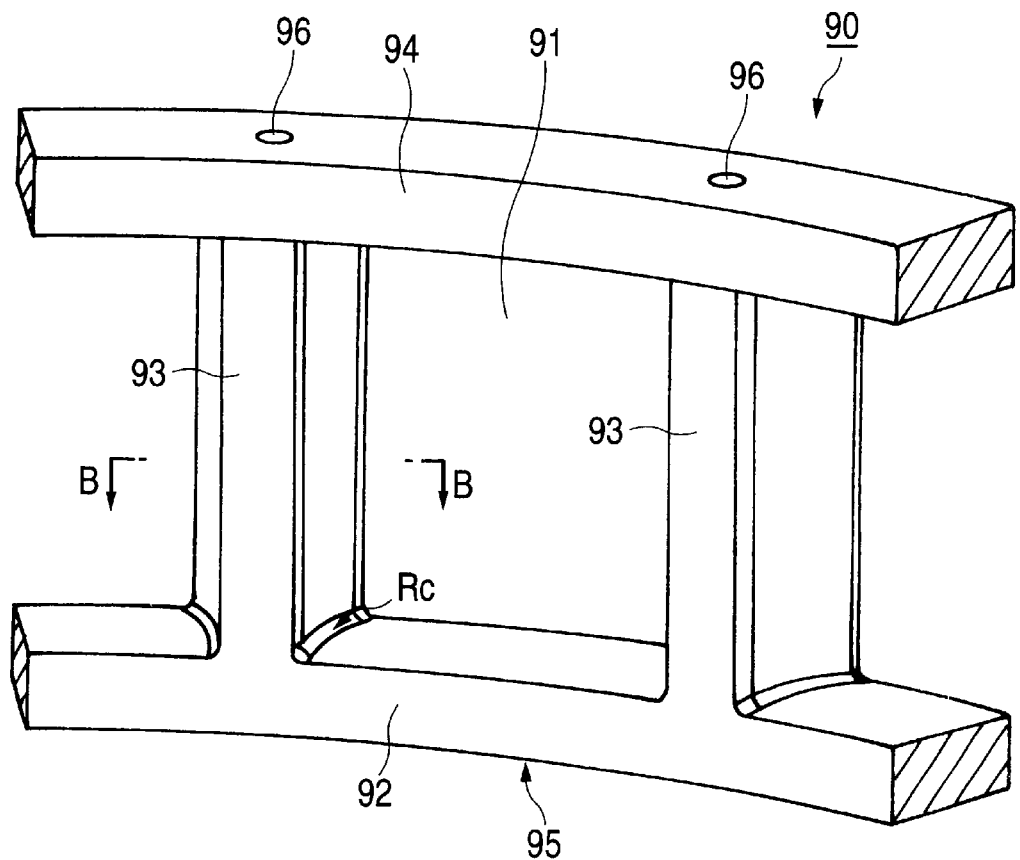
FIGS. 16A and 16B are diagrams illustrating a conventional retainer.
Figure 16B:
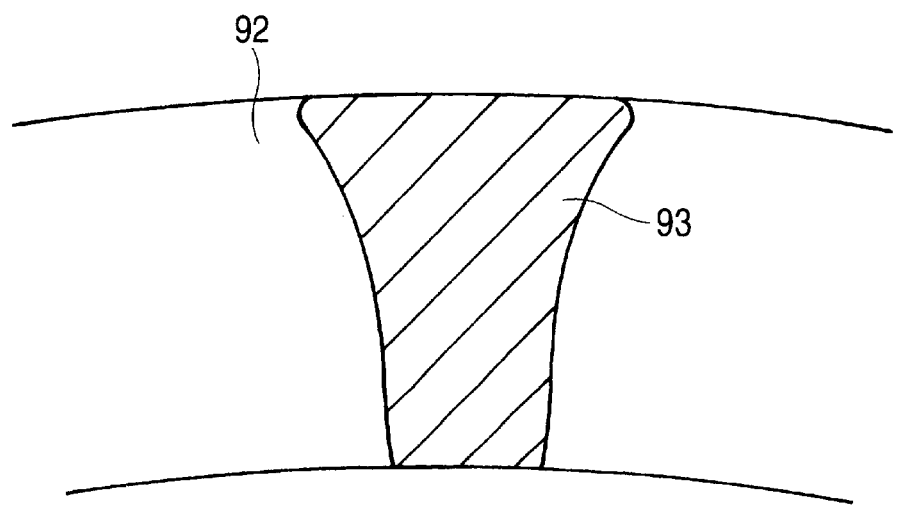

An example of FEM analysis result on a model having an indented relief 35 as shown in FIG. 6A is shown in FIG. 7. This graph illustrates how the stress increased or decreased in the indented relief 35 changes with the rise of the radius of curvature (with the rise of the size of the indented relief 35). The abscissa r/Da indicates the ratio of radius r of curvature to diameter Da of roller. The stress ratio on the ordinate indicates the value relative to the stress developed when the corners of the pocket each are formed with a radius Rc of curvature (0.2 mm in the first type or 0.6 mm in the second type) as shown in FIG. 15 as 1.

As can be seen in FIG. 7, as the radius r of curvature increases somewhat, the stress decreases. However, when the radius r of curvature increases beyond a certain point, the column or the annular portion becomes thinner to lower the strength of the retainer, causing the rise of stress.

When the circumferential average width of the column or the axial thickness of the annular portion shows various changes, the single parameter of r/Da cannot necessarily represent the range that the stress generated in the corners of the pocket decreases.

Then, the following function F based on the foregoing values d, t, r and Da can be considered:

$$F(d, t, r) = (2/d + 4/t + 1/r) \times Da$$

It is thought that the greater d, t and r are, the greater the strength of the retainer is, and the smaller Da is, the greater the strength of the retainer is. Therefore, it can be said that the smaller the value of the function F is, the greater the strength of the retainer is.

Figure 8:
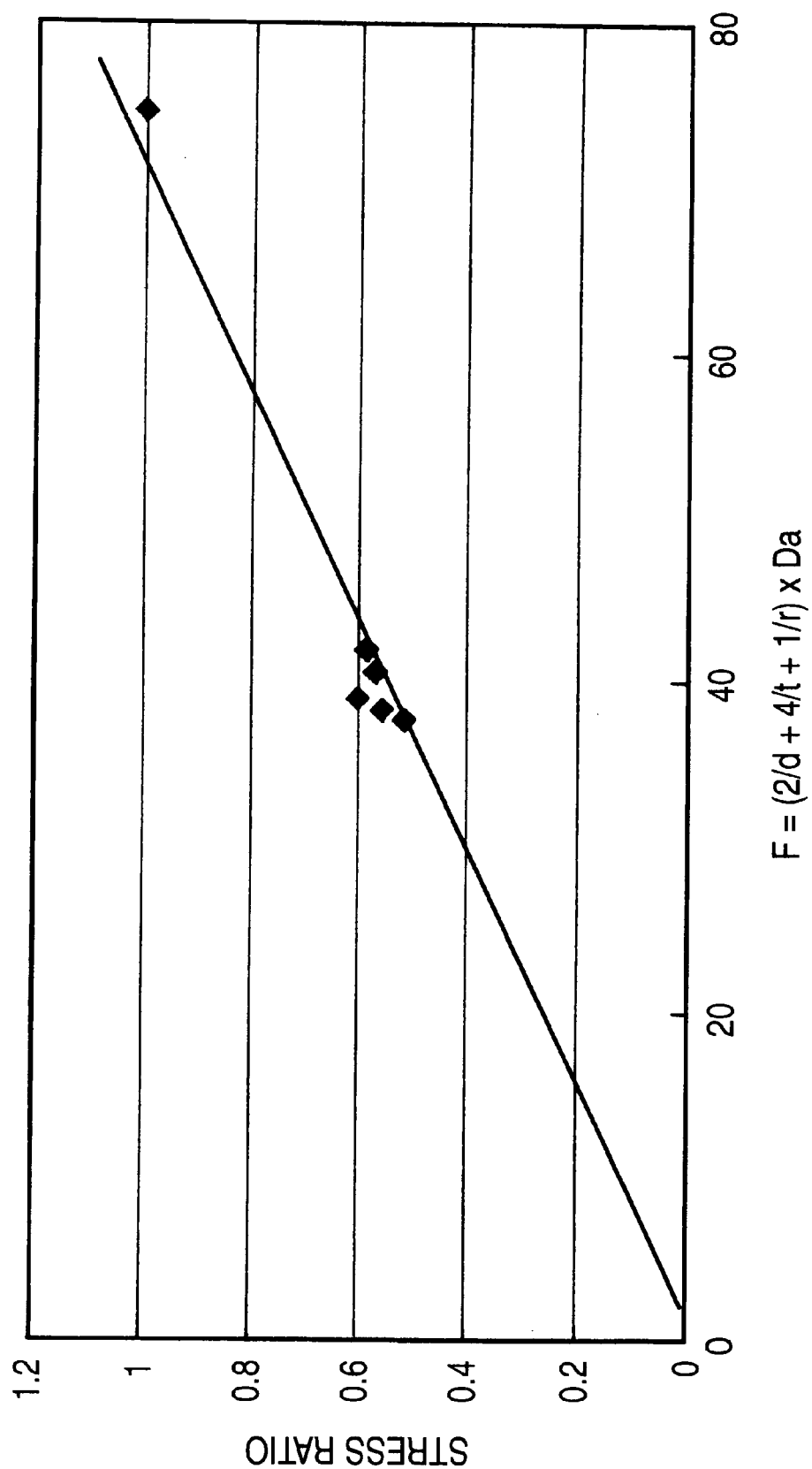
FIG. 8 is a graph based on FEM analysis.
Figure 9:
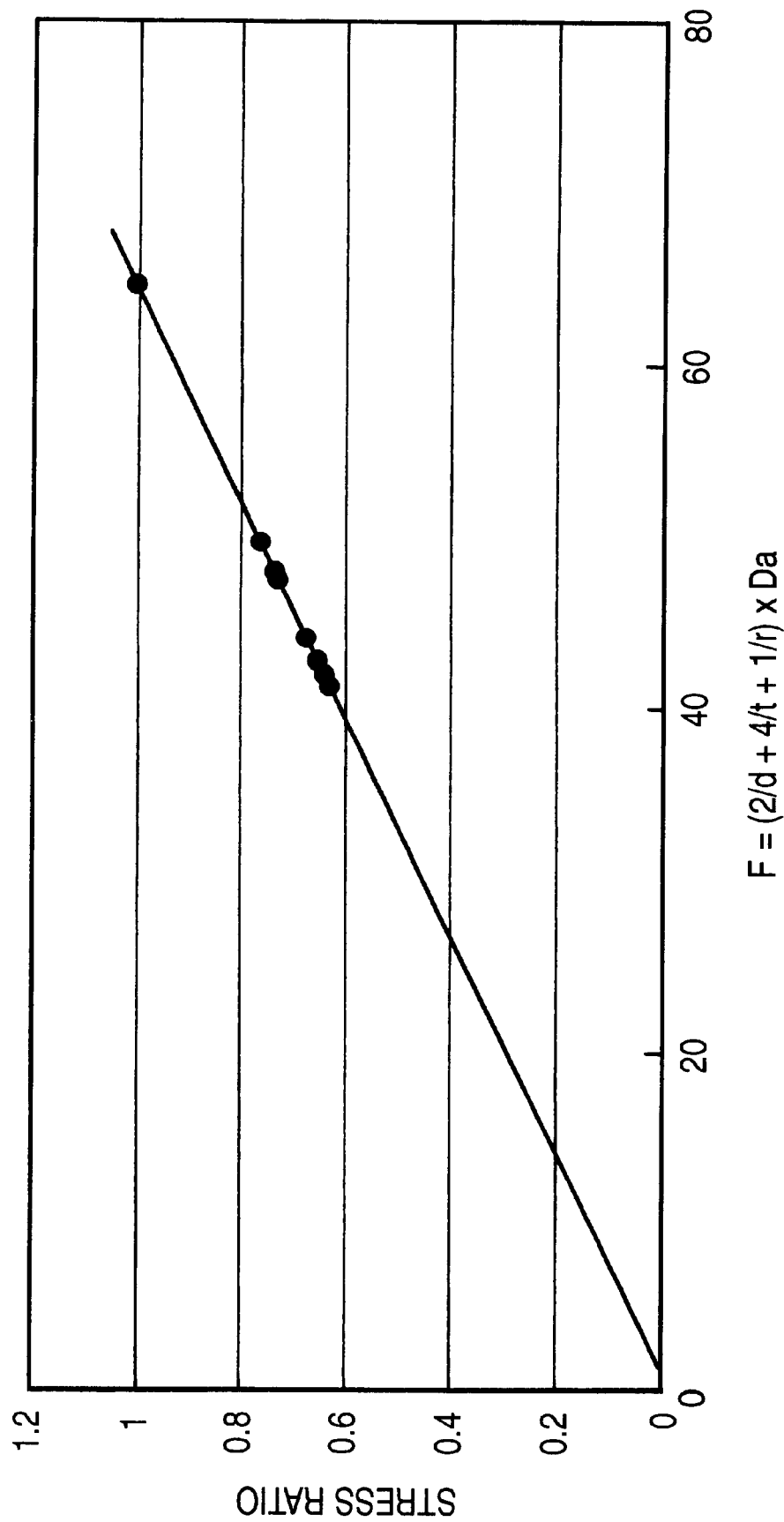
FIG. 9 is a graph based on FEM analysis.

In the model of the first type, there is a relationship between the function F and the occurred stress as shown in FIG. 8. In the model of the second type, there is a relationship between the function F and the occurred stress as shown in FIG. 9. As can be seen in these graphs, the function F and the occurred stress are substantially proportional to each other, demonstrating that the smaller the function F is, the lower the occurred stress is.

Accordingly, it is effective to find the values d, t and r such that the function F is reduced.

In order to relax the concentration of stress, the values d, t and r can be raised by decreasing the size of roller (diameter Da of roller, length L of roller) or reducing the number Z of rollers. However, these approaches are disadvantageous in that they cause the deterioration of the load capacity of bearing and the deterioration of the rolling fatigue life of bearing.

When the circumferential average width of the column and the axial thickness of the annular portion are kept constant, there are present d, t and r such that the increase of stress at the corners of the pocket is minimum.

Figure 10:
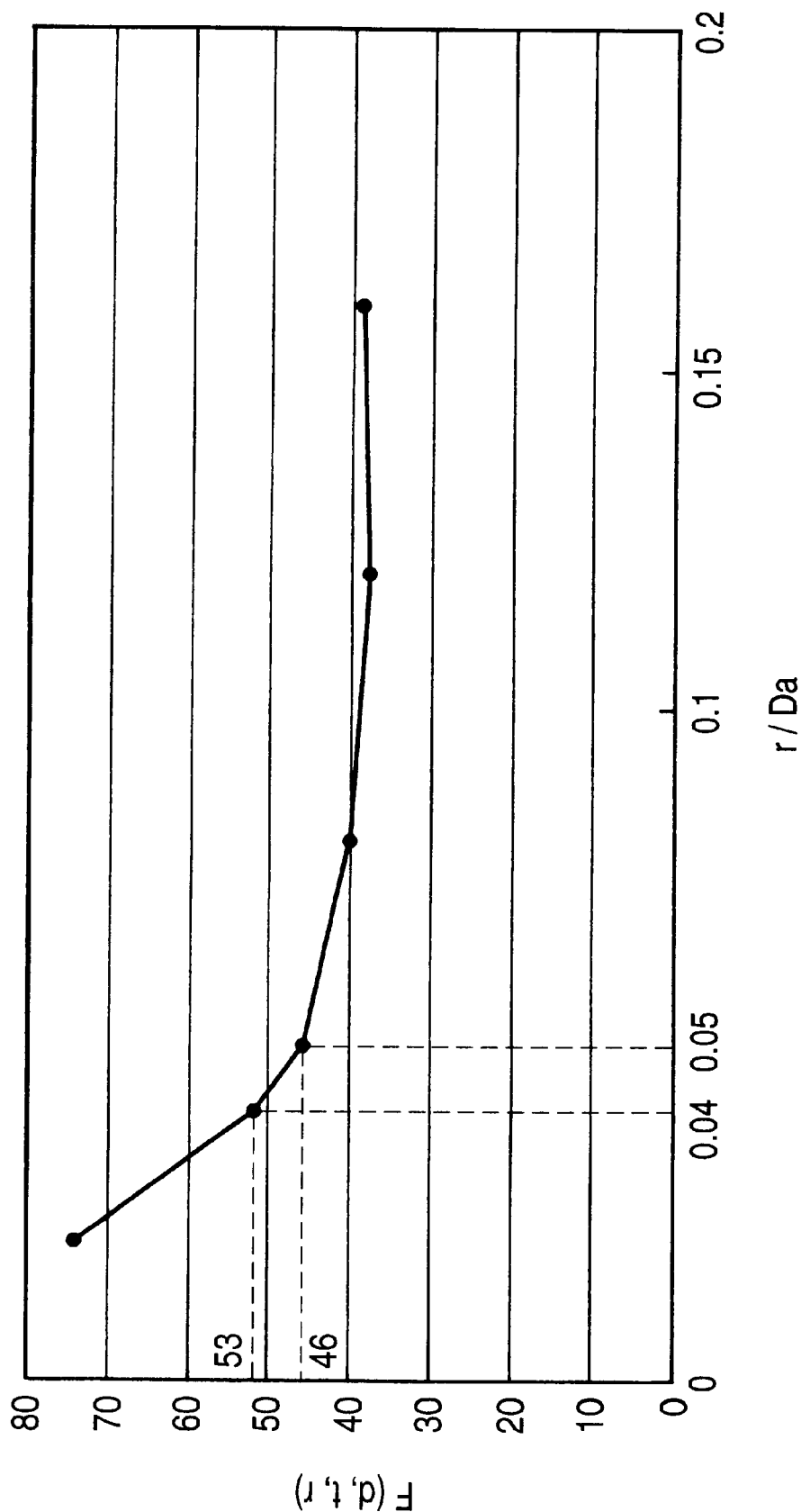
FIG. 10 is a graph based on FEM analysis.

FIG. 10 indicates the relationship between r/Da and function F in the model of first type. As can be seen in FIG. 10, when r/Da is not lower than 0.025, F shows a sudden drop. When r/Da is not lower than 0.04, F shows a sudden drop of gradient and then approaches close to the predetermined value When r/Da is 0.04, F is 53. It can thus be said that when the indented relief is provided at F (d, t, r) of not greater than 53, the desirable effect is obtained. More preferably, when r/Da is not lower than 0.05, namely, when the indented relief is provided at F (d, t, r) of not greater than 46, the more desirable effect is obtained.

Among the three values d, t and r, the increasing of r has the best advantage. Further, when d and t are kept constant, it is not necessary to change the gap between the roller and the retainer, etc.

However, when r is too great, the length over which the roller and the column come in contact with each other is reduced and the moment acting on the corners of the pocket is increased, causing the increase of the occurred stress. When the length over which the roller and the column come in contact with each other is reduced, the rollers can easily undergo skew, which is undesirable. Further, the length of the run-out preventing portion 23b (see FIG. 3) is reduced, causing the rollers to easily run-out from the retainer.

The reduction of F (d, t, r) gives a tendency that the size of the retainer wastefully becomes great as compared with that of the roller. This causes the reduction of load capacity of bearing and the deterioration of the fatigue life of bearing. The increase of the weight of the retainer leads to the cost increase.

Figure 11:
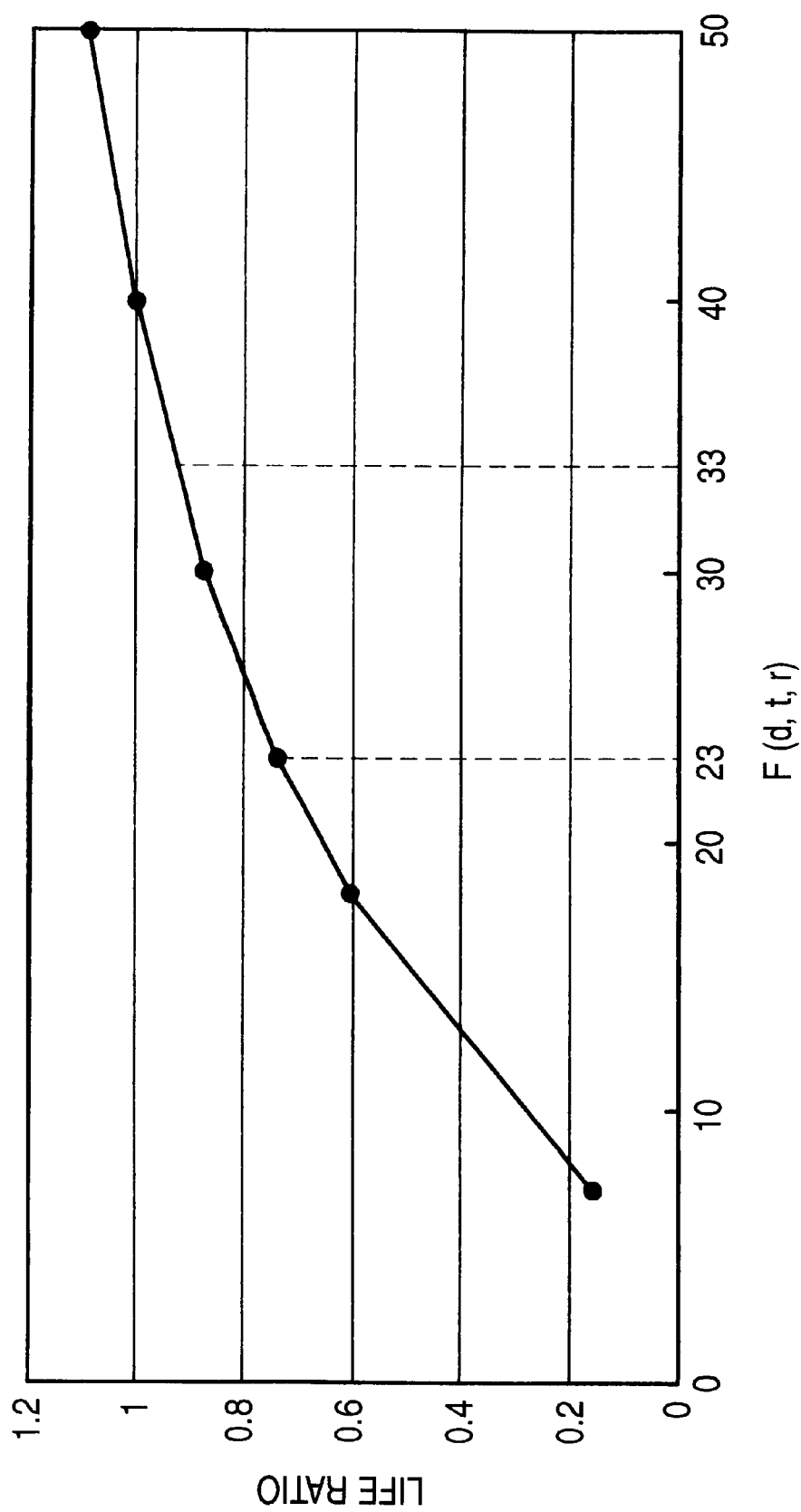
FIG. 11 is a graph based on FEM analysis.

The relationship between F (d, t, r) and the bearing fatigue life depending on load capacity in the model of first type wherein d and t are great is shown in FIG. 11. In this graph, assuming that the fatigue life of the bearing wherein as shown in FIG. 15A, the corners of the pocket each have a curvature radius Rc of 0.2 mm is 1, the fatigue life ratio on the ordinate indicates the value relative to such a life. As can be seen in FIG. 11, when F (d, t, r) is smaller than 23, the bearing life shows a sudden drop. It can thus be said that when the indented relief is provided at F (d, t, r) of not smaller than 23, the desirable effect is obtained. More preferably, when F (d, t, r) is not smaller than 33, the life ratio gradually approaches the predetermined value. Accordingly, when the indented relief is provided at F (d, t, r) of not smaller than 33, the more desirable effect is obtained.

Figure 12:
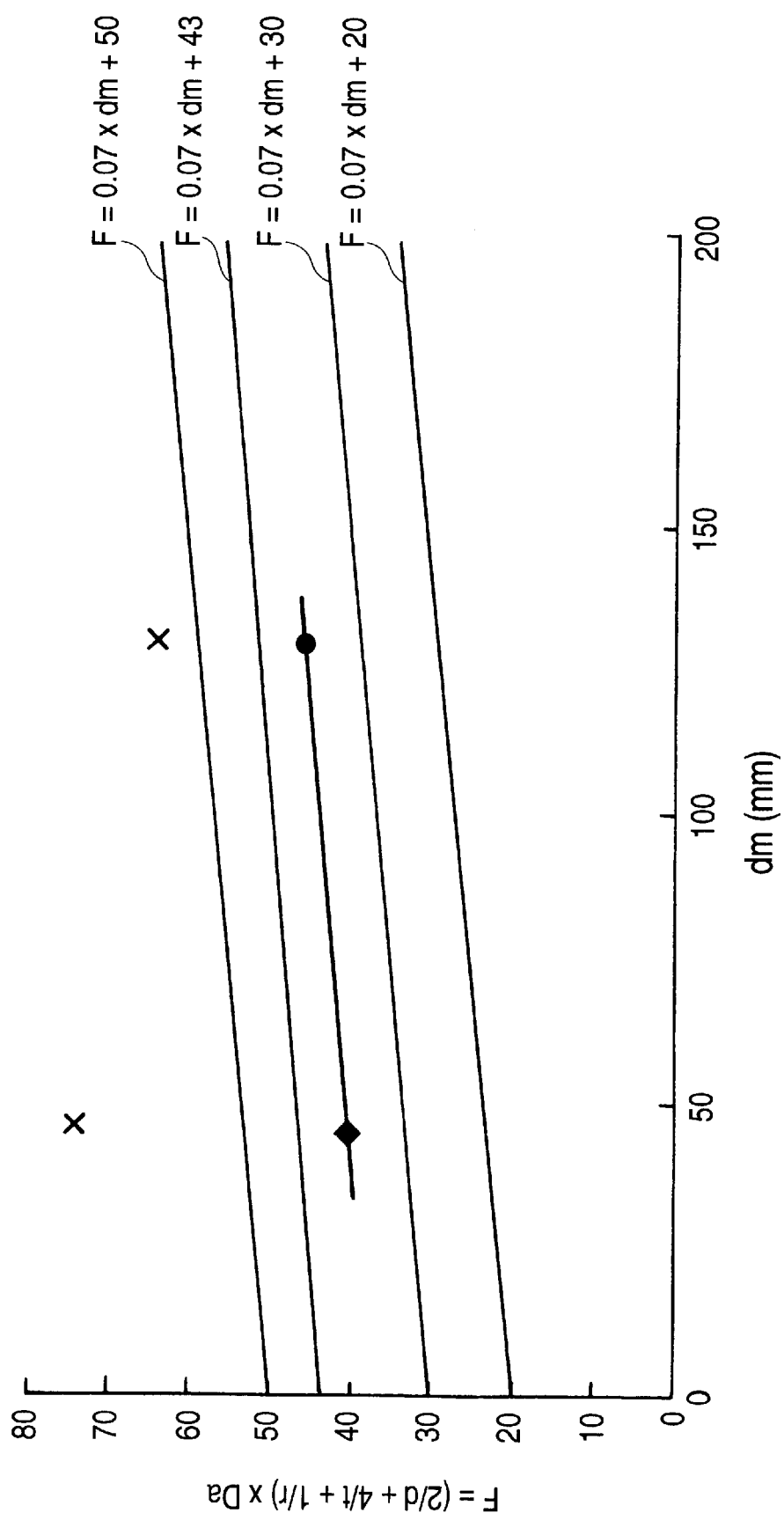
FIG. 12 is a graph based on FEM analysis.

FIG. 12 illustrates the relationship between the function F (shown by the symbol ♦) of the model of first type wherein d is 2.15 mm, t is 2.15 mm and r is 0.8 mm and the function F (shown by the symbol •) of the model of second type wherein d is 5 mm, t is 3 mm and r is 1.45 mm. As mentioned above, in the model of first type, F (d, t, r) is preferably from 23 to 53, more preferably from 33 to 46. The gradient of the straight line connecting these models (♦ and • in FIG. 12) was 0.07. In the retainers for roller bearing of the invention, including the second type, the value of function F preferably is within the range properly deviated from the above defined range in proportion to the pitch circle diameter of bearing (dm) In other words, the value of function F preferably is within the range being parallel to the straight line having a gradient of 0.07 and having the above defined range as upper and lower limits.

As can be seen in the foregoing description, F (d, t, r) is preferably not greater than 0.07×dm+50, more preferably not greater than 0.05×dm+43 from the standpoint of the strength of the retainer.

Further, F (d, t, r) is preferably not smaller than 0.07×dm+20, more preferably not smaller than 0.07×dm+30 from the standpoint of bearing life.

In FIG. 12, the symbol x indicates F measured when the corners of the pocket each are formed with a radius Rc of curvature as shown in FIG. 15A (0.2 mm in the first type or 0.6 mm in the second type). In these types, the function F is greater than the foregoing preferred range.

While the foregoing description has been made with reference to the two bore diameters of bearing, the invention can be applied to those other than these bearing sizes.

The invention is not limited to the foregoing embodiments. Proper changes and improvements may be made.

For example, while the foregoing embodiments have been described with reference to machined retainer adapted for cylindrical roller bearing, it can apply also to pressed retainer. The material of the retainer is not specifically limited. The retainer may be made of a metal such as brass copper alloy, steel, plastic or the like.

The invention can be applied to general roller bearings having a retainer such as tapered roller bearing, needle roller bearing and self-aligning roller bearing, not to mention cylindrical roller bearing, and thus can be obtained a remarkable effect.

Figure 13:
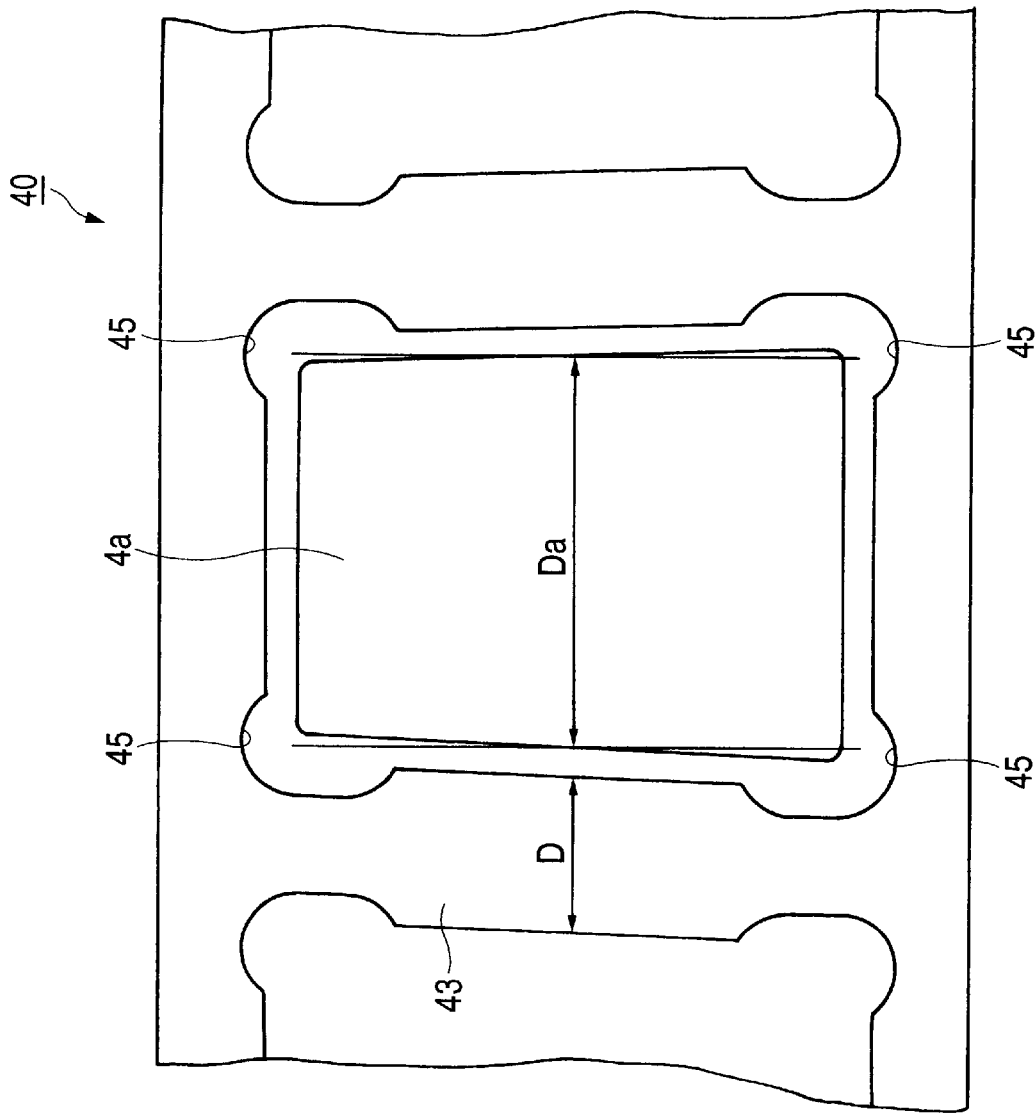
FIG. 13 is a plan view illustrating an embodiment of implication of the invention.

In the case of tapered roller bearing for example, the circumferential average width D of the column 43 at the center of the axial direction of the retainer 40 and the diameter Da of the roller 49 at the center of the axial direction of the roller 49 may be used for calculation as shown in FIG. 13. Referring to d and t of the indented relief 45, various designs may be made. For example, (i) the designed value of the larger diameter side or the smaller diameter side of the annular portions of the retainer may be employed, (ii) the average value of the larger diameter side and the smaller diameter side of the annular portions of the retainer may be employed, or (iii) the designed value may be varied from the larger diameter side and the smaller diameter side of the annular portions of the retainer. In the cases (i) and (iii), the model of FEM may be divided for calculation,

EXAMPLE

Two cylindrical roller bearings having a bore diameter of 90 mm, an outside diameter of 160 mm, a width of 30 mm, a roller diameter of 19 mm and a pitch circle diameter of 126 mm and comprising a retainer having a form as shown in FIG. 6A and F (d, t, r) of 46 (d: 5 mm; t: 3 mm; r: 1.45 mm) were prepared (Examples 1 and 2).

These cylindrical roller bearings were each subjected to life test at an acceleration of 200G (drop impact test). The bearing life was then determined by the number of repetition of dropping required until the retainer undergoes cracking around the pocket.

Further, two cylindrical bearings having the same arrangement as the foregoing cylindrical roller bearing except that a retainer as shown in FIG. 15A was used, i.e., comprising a retainer column and annular portion having the same dimension as that of the foregoing retainer but having a pocket with corners having the same shape as conventional (F (d, t, r)=65) were prepared (Comparative Examples 1 and 2). These cylindrical roller bearings were each subjected to life test in the same manner as mentioned above.

Figure 14:
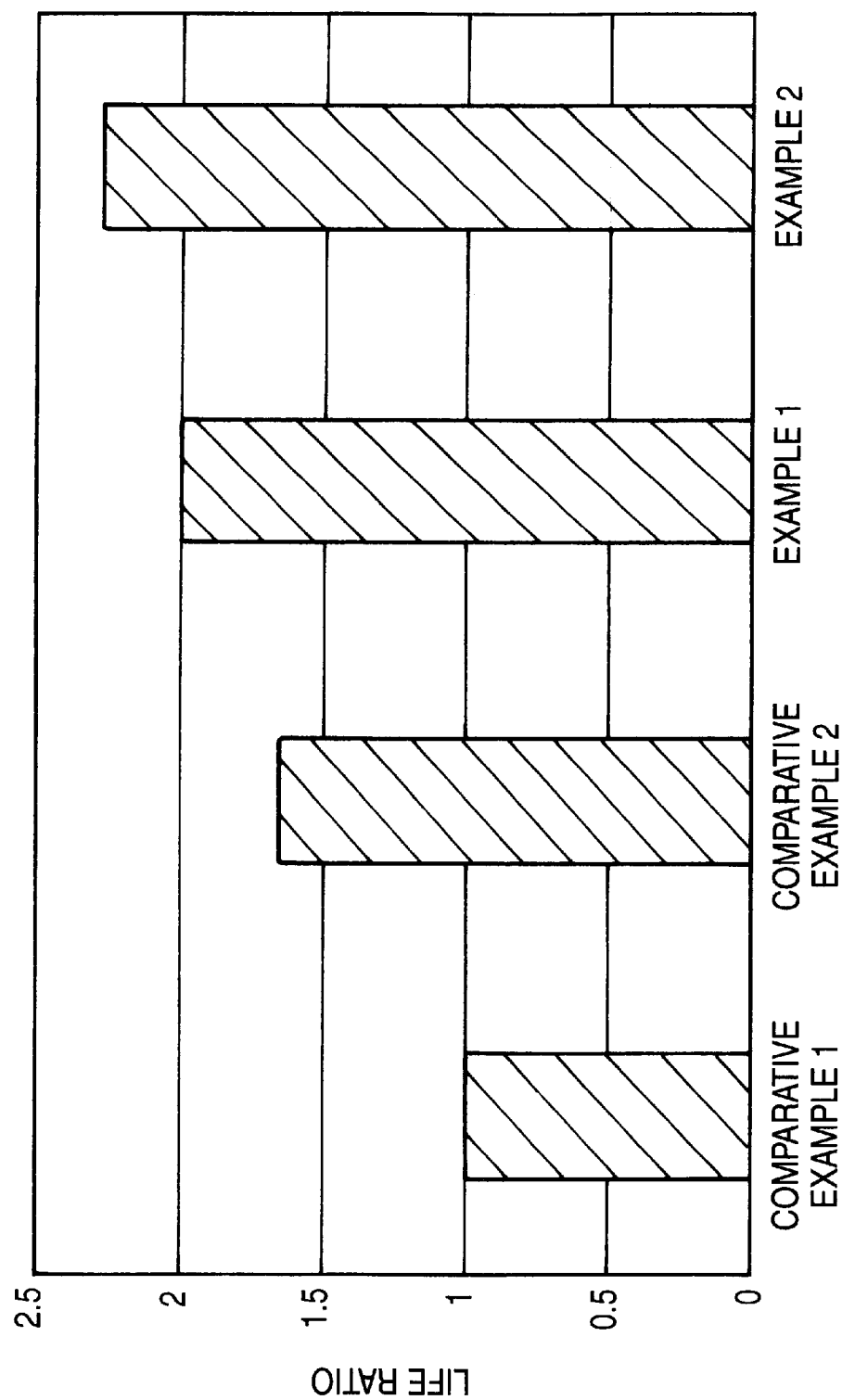
FIG. 14 is a graph illustrating the effect of an example.

The results are shown in FIG. 14. In this graph, the life ratio on the ordinate indicates the value relative to the shortest life as 1.

As can be seen in FIG. 14, Examples 1 and 2 show a drastically prolonged life as compared with Comparative Examples 1 and 2.

As mentioned above, the retainer for roller bearing of the invention can use a simple structure that obtains remarkable improvement in the strength of the corners of the pocket and hence the strength of the retainer.

What is claimed is:

1. A retainer for a roller bearing, comprising:
  a pair of annular portions; and
  a plurality of columns provided between said annular portions, said annular portions and said columns cooperatively defining a plurality of pockets each for receiving a roller,
  wherein an indented relief is formed on each of corners of the plurality of pockets, and
  wherein a circumferential average width d (mm) of said column at an area where said indented relief is formed, an axial thickness t (mm) of said annular portion at the area where said indented relief is formed, a radius r (mm) of curvature of said indented relief, an average diameter Da (mm) of the roller and a pitch circle diameter dm (mm) of the roller bearing satisfy the following relationship [1]:

$$0.07 \times dm + 20 \leq (2/d + 4/t + 1/r) \times Da \leq 0.07 \times dm + 50 \quad [1]$$

2. The retainer according to claim 1, wherein the circumferential average width d (mm), the axial thickness t (mm), the radius r (mm) of curvature, the average diameter Da (mm) and the pitch circle diameter dm (mm) satisfy the following relationship [2]:

$$0.07 \times dm + 30 \leq (2/d + 4/d + 1/r) \times Da \leq 0.07 \times dm + 43 \quad [2]$$

3. The retainer according to claim 1, wherein said indented relief is formed by an arc surface having the single radius r (mm) of curvature and extending over a side face of said column and an inner surface of said annular portion.

4. The retainer according to claim 1, wherein said indented relief is formed by an ellipsoidal arc surface connecting arcs having the single radius r of curvature through a flat surface.

5. The retainer according to claim 1, wherein said indented relief linearly extends in a radial direction of said retainer, and the radius r of curvature of a circumferential surface of said indented relief is constant over the entire radial range.

6. The retainer according to claim 1, wherein said retainer is a retainer for one of a cylindrical roller bearing and a needle roller bearing.

7. The retainer according to claim 6, wherein said retainer is a retainer for the cylindrical roller bearing,
  wherein side faces of said column are each formed in the form of part of a cylinder having a slightly greater diameter than an outer diameter of a cylindrical roller disposed opposed thereto, and
  wherein said column includes a run-out preventing portion for the roller formed on an inside and an outside in a radial direction of said retainer, for preventing run-out of the roller.

8. The retainer according to claim 1, wherein said retainer is a retainer for one of a tapered roller bearing and a self-aligning roller bearing, and
  wherein the diameter Da of the roller is a value of a diameter of the roller at the center of an axial direction of the roller, and the circumferential average width d and the axial thickness t of said indented relief are set to respective values equal to average values of a larger diameter side of annular portions of said retainer and a smaller diameter side of said annular portions of said retainer.

9. The retainer according to claim 1, wherein said retainer is a retainer for one of a tapered roller bearing and a self-aligning roller bearing, and
  wherein the diameter Da of the roller is a value of a diameter of the roller at the center of an axial direction of the roller, and the circumferential average width d, the axial thickness t, and a radius r of curvature of said indented relief are set to respective values of a larger diameter side of annular portions of said retainer or a smaller diameter side of said annular portions of said retainer.

10. A roller bearing comprising said retainer according to claim 1.

* * * * *